(12) United States Patent
Kirschner

(10) Patent No.: US 7,516,922 B1
(45) Date of Patent: Apr. 14, 2009

(54) SWAY BRACE AND METHOD FOR SECURING A PIPE OR CONDUIT AGAINST SWAY

(75) Inventor: Kraig A. Kirschner, Corona, CA (US)

(73) Assignee: Automatic Fire Control, Incorporated, South El Monte, CA (US)

( * ) Notice: Subject to any disclaimer, the term of this patent is extended or adjusted under 35 U.S.C. 154(b) by 228 days.

(21) Appl. No.: 11/556,587

(22) Filed: Nov. 3, 2006

(51) Int. Cl.
  *F16L 3/08* (2006.01)
(52) U.S. Cl. ............... 248/65; 248/74.1; 248/230.6
(58) Field of Classification Search ............ 248/65, 248/73, 74.1, 230.1, 230.6, 230.7, 230.9, 248/231.71, 231.81; 52/713, 655.1, 653.2; 24/298, 302, 278, 19
  See application file for complete search history.

(56) References Cited

U.S. PATENT DOCUMENTS

| | | | |
|---|---|---|---|
| 780,420 A | 1/1905 | Gross | 248/70 |
| 1,243,388 A | 10/1917 | Corley | 248/215 |
| 2,630,074 A | 3/1953 | Grabinski | 104/112 |
| 2,856,216 A | 10/1958 | Witzel | 403/225 |
| 2,931,605 A | 4/1960 | Kelly | 248/59 |
| 2,937,226 A | 5/1960 | Kaminski, Jr. | 174/40 R |
| 2,956,103 A | 10/1960 | Steel | 174/40 R |
| 3,233,850 A | 2/1966 | Merker et al. | 248/49 |
| 3,570,794 A | 3/1971 | Kirschner | 248/74 |
| 3,582,030 A | 6/1971 | Barrett, Jr. | 248/68.1 |
| 3,884,438 A | 5/1975 | Logsdon | 248/59 |
| 4,172,578 A | 10/1979 | Pate | 248/74.3 |
| 4,288,171 A | 9/1981 | Kottke | 403/218 |
| 4,697,770 A | 10/1987 | Kirschner | 248/62 |
| 4,714,218 A | 12/1987 | Hungerford, Jr. | 248/62 |
| 5,004,193 A | 4/1991 | Kirschner | 248/59 |
| 5,007,603 A | 4/1991 | Kirschner | 248/59 |
| 5,072,903 A | 12/1991 | Griffin | 248/72 |
| 5,111,770 A | 5/1992 | Weelink | 119/523 |
| 5,145,132 A | 9/1992 | Kirschner | 248/59 |
| 5,295,646 A | 3/1994 | Roth | 248/58 |
| 5,323,988 A | 6/1994 | Handler | 248/49 |
| 5,961,248 A | 10/1999 | Tourtellotte | 403/400 |

(Continued)

FOREIGN PATENT DOCUMENTS

DE    4309330 A1 * 9/1994

OTHER PUBLICATIONS

U.S. Appl. No. 11/445,490, filed Jun. 1, 2006, Kirschner.

(Continued)

*Primary Examiner*—A. Joseph Wujciak, III
(74) *Attorney, Agent, or Firm*—Connolly Bove Lodge & Hutz LLP

(57) ABSTRACT

A sway brace including a U-shaped strap with flanges at each end. The flanges are mounted to two mounting fixtures including block bodies and passages therethrough. Mounting surfaces on the fixtures receive the flanges of the U-shaped strap. Threaded members affix the flanges to the mounting surfaces of the mounting fixtures. The passages each have a cross section which is bounded by a locus of points defined by a first circle having a first diameter, a second circle having a second, smaller diameter and partially overlapping the first circle and a common tangent to the first and second circles. The smaller circle extends away from a setscrew which is perpendicular to the plane of the U-shaped strap.

6 Claims, 2 Drawing Sheets

U.S. PATENT DOCUMENTS

| | | | | |
|---|---|---|---|---|
| 6,062,515 | A | 5/2000 | Snyder | 248/62 |
| 6,227,757 | B1 | 5/2001 | Delouvee et al. | 403/400 |
| 6,234,277 | B1 | 5/2001 | Kaczmarek | 187/414 |
| 6,296,211 | B1 | 10/2001 | Snyder | 248/71 |
| 6,464,182 | B1 | 10/2002 | Snyder | 248/71 |
| 6,508,441 | B1 | 1/2003 | Kirschner | 248/62 |
| 6,594,869 | B1 | 7/2003 | Chen | 24/274 R |
| 6,629,678 | B1 | 10/2003 | Kirschner | 248/228.6 |
| 6,802,569 | B1 | 10/2004 | Conard et al. | 301/5.24 |
| 2006/0027716 | A1* | 2/2006 | Walz | 248/73 |

OTHER PUBLICATIONS

Office Action mailed Jul. 2, 2008 in Kirschner U.S. Appl. No. 11/445,490, filed Jun. 1, 2006.

Amendment filed Nov. 3, 2008 in Kirschner U.S. Appl. No. 11/445,490, filed Jun. 1, 2006.

Supplement Amendment filed Nov. 4, 2008 in Kirschner U.S. Appl. No. 11/445,490, filed Jun. 1, 2006.

* cited by examiner

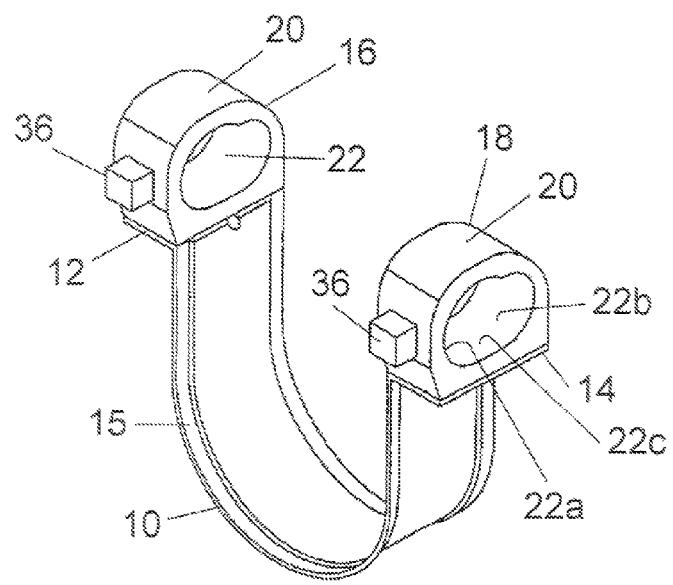
Fig. 1
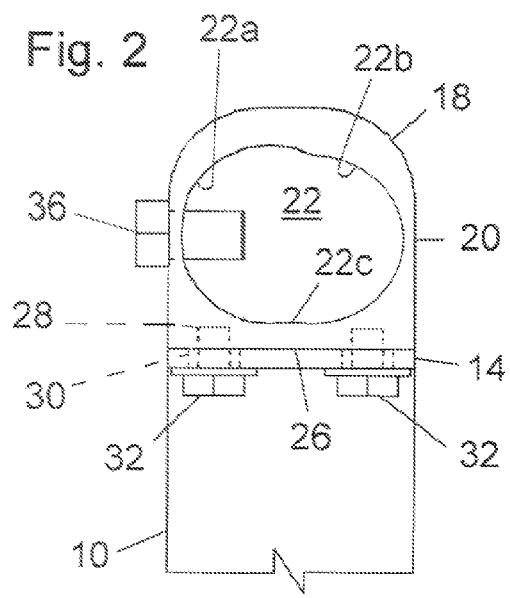
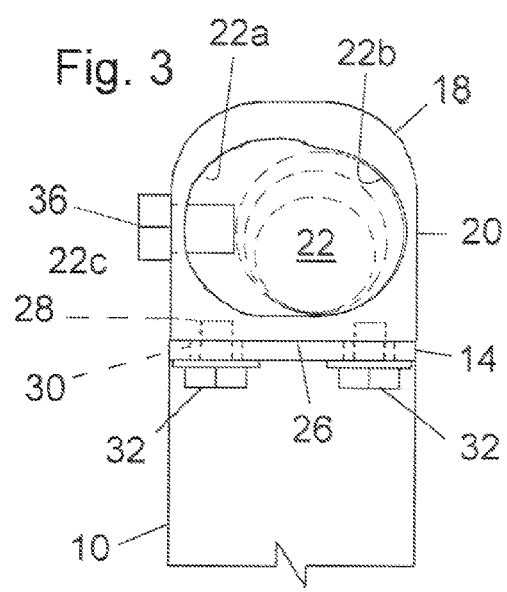

SWAY BRACE AND METHOD FOR SECURING A PIPE OR CONDUIT AGAINST SWAY

BACKGROUND OF THE INVENTION

The field of the present invention is bracing for preventing pipes from swaying relative to an associated building structure.

Building codes, as well as competent construction practice, require the securing of fluid lines and other utilities to the structure of a building to brace such lines against damaging movement resulting from seismic disturbances. Sway braces have been designed for securing numerous types of fluid supply lines. An example of such secured lines is fire control water sprinkler distribution pipes. When sprinkler systems are used in buildings, it is required that the water distribution pipes be adequately braced so that, in the event of an earthquake, the pipes will not unduly sway relative to adjacent portions of the building and separate or produce excessive leakage at the pipe joints. Such bracing is not necessarily contemplated for sustaining the full load of the pipe during normal operation. Indeed, the sway brace may actually be loosely fit on the pipe or utility line pending engagement during seismic activity.

One such brace is illustrated in U.S. Pat. No. 6,508,441. Other types of sway brace structures are exemplified in U.S. Pat. Nos. 4,697,770 and 3,570,794. The disclosures of all three patents are incorporated herein by reference. Traditionally, sway braces are formed from sheet metal as can be seen in the referenced patents. They include a mechanism to grip the pipe or conduit, a constraint tie and a bracket or fastener to attach to structure with which the pipe or conduit is to have little relative movement.

SUMMARY OF THE INVENTION

The present invention is directed to sway bracing employing U-shaped straps.

In a first separate aspect of the present invention, two mounting fixtures which each include a block body, a passageway extending through the block body and a mounting surface are positioned at the two ends of the strap. Flanges extend substantially perpendicular to the U-shaped straps at their ends to be affixed to the mounting surfaces of the bodies. Engagement members engage the two mounting fixtures at the mounting surfaces to retain the flanges of the U-shaped strap. The passages each have a cross section which is bounded by a locus of points defined by a first circle having a first diameter, a second circle having a second, smaller diameter and partially overlapping the first circle and a common tangent to the first and second circles. The smaller circle extends away from a setscrew which is perpendicular to the plane of the U-shaped strap.

In a second separate aspect of the present invention, sway brace assemblies for a pre-selected outside diameter pipe include U-shaped straps and sets of two mounting fixtures mounted to the ends of each strap. Each set of two mounting fixtures includes passages through the fixtures, respectively. The fixtures also include mounting surfaces. Different sets have different passage diameters but the distance between the mounting surface and the wall of the passage on each mounting fixture is equal for all sets.

In a third, more inclusive aspect of the present invention, the sway brace further includes a tie which is held within the passages of the mounting fixtures of the prior separate aspects. This tie is ultimately connected through a bracket to the structure of the associated building.

In a fourth separate aspect of the present invention, a method for securing a pipe or conduit against sway relative to a building structure includes selecting a U-shaped strap having an inside width substantially equal to the outside diameter of the pipe or conduit and an inside depth dimension less than the outside diameter of the pipe or conduit and selecting two mounting fixtures having block bodies with passages therethrough, mounting surfaces on one side or each and an equal distance between the passages and the mounting surfaces from a series of mounting fixtures having different diameter passages and equal distances between the passages and the mounting surfaces. The passages each have a cross section which is bounded by a locus of points defined by a first circle having a first diameter, a second circle having a second, smaller diameter and partially overlapping the first circle and a common tangent to the first and second circles. The selected U-shaped strap are assembled with the two selected mounting fixtures at the ends of the U-shaped strap. The depth of the U-shaped strap and the distance between the passages and the mounting surfaces are additive to substantially equal the outside diameter of the pipe or conduit. The resulting structure may then be associated with a tie and a bracket to be affixed to the building structure.

Accordingly, it is an object of the present invention to provide an improved sway brace and method of mounting pipe. Any of the forgoing separate aspects of the present invention may also be combined to greater advantage. Other and further objects and advantages will appear hereinafter.

BRIEF DESCRIPTION OF THE DRAWINGS

FIG. 1 is a perspective view of a sway brace.

FIG. 2 is an end view of the sway brace of FIG. 1.

FIG. 3 is an end view of the sway brace of FIG. 1 further illustrating other passage diameter sizes and placement.

DETAILED DESCRIPTION OF THE PREFERRED EMBODIMENT

Figure 4:
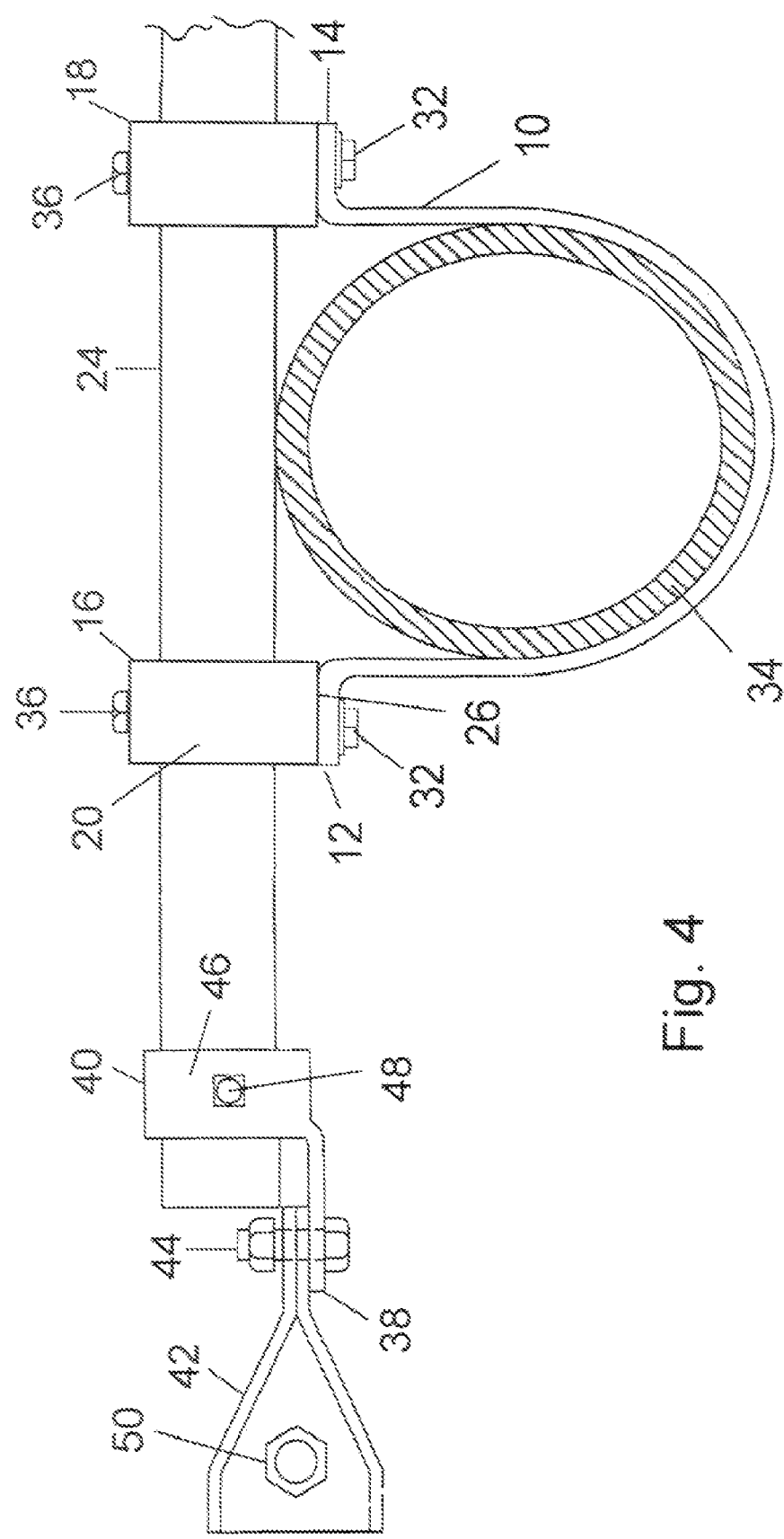
FIG. 4 is a front view of the sway brace of FIG. 1 with an associated tie and a supported pipe, the pipe being in cross-section.

The Figures illustrate a sway brace including a U-shaped strap 10. The strap 10 contemplates a specific diameter of pipe to be retained therein and does not naturally conform to the shape of the pipe or conduit as strap 10 is typically rigid. Further, the pipe or conduit is not supported by the strap 10 such that the strap 10 would conform to a constant load. The strap has two ends which conclude with flanges 12, 14. The flanges 12, 14 extend substantially perpendicular to the U-shaped strap 10 at the ends of the strap 10 in opposite directions from one another as can be seen in the Figures. The U-shaped strap 10 is shown to include margins 15 to either side which are formed to flare to a small extent outwardly from the concave side of the strap 10. These margins 15 can provide some relief to the pipe when engaged by the strap 10 and can add bending strength. The strap 10 is typically two inches wide and may be formed to receive a six inch pipe or conduit, typical in the sprinkler industry. Other sizes are equally accommodated.

A set of two mounting fixtures 16, 18 are contemplated to mate with one strap 10 at the flanges 12, 14. The mounting fixtures 16, 18 each include a block body 20 which is typically cast. A passage 22 extends therethrough. The passage 22 has a cross section normal to its longitudinal extent which is most accurately defined in the preferred embodiment as bounded by a locus of points made up of overlapping circles with one common tangent there between. A first circle 22*a* has a first diameter easily able to receive a pipe 24 with a nominal outside diameter which is smaller than the first diameter. A second, smaller circle 22*b* has a second diameter that is approximately the same as the nominal outside diameter of the pipe 24 to be positioned within the passage 22. See the assembly of FIG. 4. A common tangent 22*c* extends between the circles 22*a* and 22*b* to avoid the formation of a ridge between the two circles below the overlap.

Preferably, the circles 22*a* and 22*b* overlap to an extent that the smaller circle 22*b* intersects the larger circle 22*a* at a point that is diametrically opposed to the point the common tangent 22*c* intersects the circle 22*b*. This degree of overlap preserves the greatest circumference of the second circle 22*b* without forming a ridge into the passage 22 at the intersection of the two circles 22*a* and 22*b* on the other side of the passage 22 from the common tangent 22*c*. This point of overlap also has the relationship that the local tangent to the smaller circle 22*b* is parallel to the common tangent 22*c* diametrically opposed across the smaller circle 22*b*.

The same block body 20 with different size passages 22 is contemplated for use with different diameter pipe 24. FIG. 3 shows two smaller sizes of pipe 24 in phantom. The smaller circle 22*b* is configured to fit these pipe sizes. The larger circle 22*a* can also be relatively smaller than illustrated but larger than the corresponding circle 22*b* for facile receipt of the pipe 24. The passages 22 of sets of mounting fixtures 16 and 18 for accommodating various diameters of pipe 24 are all arranged with the distance between the wall of the passage 22 and the mounting surface 26 of each block body 20 equal. As shown in FIG. 3, the alternative pipe diameters are all arranged to sit at the common tangent 22*c* spaced uniformly from the mounting surface to meet this criteria.

One side of the bodies 20 of each of the mounting fixtures 16, 18 defines a mounting surface 26. These mounting surfaces 26 are shown to be parallel to the longitudinal extent of the passages 22 but could also be perpendicular or skewed with appropriate mounting accommodations with the flanges 12, 14 on the ends of the U-shaped strap 10. Tapped holes 28 extend into the mounting surface 26. These holes 28 are arranged as best illustrated in FIG. 2. Forces on the strap 10 during use tend to be uniformly distributed at the mounting with the mounting fixtures 16, 18. The block bodies 20 provide the capacity for a closer tolerance on the positioning of the mounting surface 26, a closer tolerance on the distance from that surface to the passage 22 and greater integrity and closer tolerance on the tapped holes 28 than provided by sheet metal formation.

The flanges 12, 14 include two mounting holes 30 therethrough capable of aligning with the tapped holes 28 for receipt of threaded members 32. These threaded members are conveniently threaded bolts which are threadably engaged with the tapped holes 28. The bolts 32 are tightened against the flanges 12, 14 to present an assembled sway brace.

The sway brace is shown in FIG. 4 with additional components facilitating its mounting with the structure of an associated building. A sprinkler pipe or other utility conduit 34 is shown in place within the U-shaped strap 10. The mounting fixtures 16, 18 associated with the U-shaped strap 10 are also shown in assembly with the rigid tie 24 which is most conveniently a pipe. Setscrews 36 retain the mounting fixtures 16, 18 by extending through the bodies 20 to lock against the pipe 24. These setscrews 36 have square heads for purchase using a wrench for greater holding ability than provided by a head accommodating a screwdriver.

The setscrews 36 extend through each block body 20 into the passage 22 perpendicular to the plane of the U-shaped strap 10. The plane of the U-shaped strap 10 is understood herein to be a centerline lying within the legs and U-shaped end of the strap 10. Each setscrew 36 is arranged across the large circle 22*a* from the small circle 22*b* as the smaller circle 22*b* is displaced from concentricity with the first circle in a direction away from the setscrew 36. By the setscrews 36 and the smaller circles 22*b* of the passages 22 being arranged relative to the U-shaped strap 10 as they are, the passages 22 receive the pipe 24 snugly within the smaller circles 22*b* under influence of the setscrews 36. Movement of the pipe 24 is thus snugly constrained through about one-half of its surface area within the passages 22, within the portion defined by the smaller circles 22*b* as held by the setscrews 36, rather than by line contact in a oversized passage and point contact by a setscrew.

A bracket 38 is associated with one end of the pipe 24. The bracket 38 is defined by two elements 40, 42 with a pinned coupling 44 provided by a bolt and nut. The element 40 includes a first attachment which is shown to be a pipe collar 46 that is positioned about the pipe 24. A setscrew 48 retains the collar 46 on the pipe 24. The element 46 has a second attachment which is a bolt hole to receive a bolt and nut 50. The bolt hole has an access which is perpendicular to the pinned coupling 44 for maximum mounting flexibility.

FIG. 4 also illustrates the relationship of the bracket to the constrained pipe 34. Without necessarily tightly gripping the pipe 34 of pre-selected outside diameter which typically conforms to an industry standard, the bracket is sized to closely constrain the pipe 34 from movement. The U-shaped strap 10 is shorter than conventional such straps which are typically anchored to a flat surface.

To place the constraining pipe 24 close to the constrained pipe 34, the distance between the mounting surface 26 and the passage 22 is added to the depth of the U-shaped strap 10 to establish the close fit. As noted earlier, the mounting fixtures 16, 18 are constructed with a common distance between the smaller diameter portion 22*b* of the passage 22 and the mounting surface 26 regardless of the size of the passage 22 as may be required to accommodate the constraining pipe 24. This feature establishes the correct fit for the constrained pipe 34 with every U-shaped strap 10 selected with an inside width appropriate for the pre-selected outside diameter of the pipe 34 regardless of the diameter of the constraining pipe 24. As such, a single strap size is employable with any of several block bodies 20 configured for different diameter constraining pipe 24. The oversize of the larger circle portion 22*a* of the passages 22 to the tie pipe 24 is not of consequence as the setscrews 36 force the constraining pipe 24 into the closely fitting smaller circle portion 22*b* of the passages 22. Upon tightening the setscrews 36, the brace tightens up on the pipe 24 and achieves a snug fit about the pipe 34.

The system provides a structure and method by which strap elements may be associated with mounting fixtures specifically selected from a given tie which is typically a length of pipe from one inch to two inches in diameter. The threaded members mounting the U-shaped strap to the mounting fixtures are symmetrically arranged relative to the centerline of the passage and spaced apart to accommodate various passage sizes as may be necessary to receive various sizes of pipe. In this way, a versatile supply may be maintained to accommodate various sizes of constraining pipe upon which the sway brace is mounted to various sizes of constrained pipe or utility conduit.

Accordingly, an improved sway brace has been shown and described. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A sway brace comprising
    a U-shaped strap for supporting a pipe or conduit, including
        two ends and
        attachment flanges at the ends, respectively; and
    two mounting fixtures, each mounting fixture including
        a block body,
        a passage extending through the block body, said passage having a cross section which is bounded by a locus of points defined by a first circle having a first diameter, a second circle having a second, smaller diameter and partially overlapping the first circle and a common tangent to the first and second circles for inserting a rigid tie through the passage of the block body,
        a mounting surface, wherein the two end being attachable to the mounting surfaces, and
        a setscrew extending through the block body into the passage perpendicular to the plane of the U-shaped strap, the second circle being displaced from concentricity with the first circle in a direction away from the setscrew;
        engagement members affixing the flanges to the mounting fixtures in juxtaposition with the mounting surfaces, respectively, each engagement member being a threaded bolt, the flanges each having two mounting holes therethrough to receive the bolts and the block bodies having tapped holes through the mounting surfaces to threadably receive the bolts.

2. The sway brace of claim 1, the first circle intersecting the second circle at a point on the second circle where a local tangent to the second circle is parallel to the common tangent.

3. The sway brace of claim 1, the flanges extending perpendicularly to the ends of the U-shaped strap, respectively.

4. A sway brace comprising
    a U-shaped strap for supporting a pipe or conduit, including
        two ends and
        attachment flanges at the ends, respectively; and
    two mounting fixtures, each mounting fixture including
        a block body,
        a passage extending through the block body, said passage having a cross section which is bounded by a locus of points defined by a first circle having a first diameter, a second circle having a second, smaller diameter and partially overlapping the first circle and a common tangent to the first and second circles,
        a mounting surface, wherein the two end being attachable to the mounting surfaces, and
    a setscrew extending through the block body into the passage perpendicular to the plane of the U-shaped strap, the second circle being displaced from concentricity with the first circle in a direction away from the setscrew;
    a rigid tie extending through the passage in each mounting fixture with the rigid tie having a nominal outside diameter equal to the diameters of the second, smaller circles, the setscrews being extendable to engage and hold the tie in the passages.

5. The sway brace of claim 4 further comprising
    a bracket including
        a first element having a first attachment,
        a second element having a second attachment and
        a pinned coupling between the first and second elements, the first element being affixed to the rigid tie.

6. The sway brace of claim 5, the rigid tie being a pipe and the first attachment being a pipe collar having a collar setscrew.

\* \* \* \* \*